United States Patent
Puleston et al.

(10) Patent No.: US 7,164,353 B2
(45) Date of Patent: Jan. 16, 2007

(54) METHOD AND SYSTEM FOR TESTING RFID DEVICES

(75) Inventors: David John Puleston, Duluth, GA (US); Benjamin John Kingston, Suwanee, GA (US); Ian J. Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 179 days.

(21) Appl. No.: 11/021,118

(22) Filed: Dec. 22, 2004

(65) Prior Publication Data

US 2006/0145710 A1 Jul. 6, 2006

(51) Int. Cl.
*G08B 29/00* (2006.01)
*G08B 13/14* (2006.01)
*G01R 33/12* (2006.01)
*G01N 27/72* (2006.01)

(52) U.S. Cl. ............... 340/514; 340/572.1; 340/572.7; 324/210; 324/227

(58) Field of Classification Search ............... 340/514, 340/572.1, 572.4, 572.7; 324/376, 377, 457, 324/210, 211, 212, 227, 228, 605; 714/25
See application file for complete search history.

(56) References Cited

U.S. PATENT DOCUMENTS

| | | | |
|---|---|---|---|
| 5,983,363 A | 11/1999 | Tuttle | |
| 6,058,497 A | 5/2000 | Tuttle | |
| 6,104,291 A | 8/2000 | Beauvillier et al. | |
| 6,236,223 B1 | 5/2001 | Brady et al. | |
| 6,259,353 B1 | 7/2001 | Berger et al. | |
| 6,275,043 B1 | 8/2001 | Muehlberger et al. | |
| 6,346,881 B1 * | 2/2002 | Davidson | ............ 340/514 |
| 6,394,346 B1 | 5/2002 | Bonneau, Jr. et al. | |
| 6,412,086 B1 | 6/2002 | Friedman et al. | |
| 6,487,681 B1 | 11/2002 | Tuttle et al. | |
| 6,721,912 B1 | 4/2004 | Burger et al. | |
| 6,784,789 B1 | 8/2004 | Eroglu et al. | |
| 2005/0150102 A1 | 7/2005 | Bosco et al. | |

FOREIGN PATENT DOCUMENTS

WO    WO 2004/072892 A2    8/2004

* cited by examiner

*Primary Examiner*—Toan N. Pham
(74) *Attorney, Agent, or Firm*—Kriegsman & Kriegsman (57) ABSTRACT

A method and system for testing a plurality of RFID devices disposed on a common carrier. In one embodiment, the RFID devices are evenly spaced along the length of the carrier, and the system comprises a short-range tester, a long-range tester and a computer, the short-range tester being coupled to the computer and having a short-range testing position, the long-range tester being coupled to the computer and having a long-range testing position, the long-range testing position being spaced downstream from the short-range testing position by a known number of device positions. In use, an RFID device of interest is first positioned at the short-range testing position, and the short-range tester reads a unique identifier for that RFID device and communicates the identifier to the computer. The carrier is then advanced so that subsequent RFID devices are read by the short-range tester. When the RFID device of interest has advanced to the long-range testing position, the long-range tester conducts a performance test and communicates any detected results to the computer. Because the distance between the two testing positions is known, the computer knows when the RFID device of interest is at the long-range testing position and uses the identifier to distinguish the results for that device from the results of any other devices.

42 Claims, 5 Drawing Sheets

METHOD AND SYSTEM FOR TESTING RFID DEVICES

BACKGROUND OF THE INVENTION

The present invention relates generally to methods and systems for testing radio frequency identification (RFID) devices and relates more particularly to a novel method and system for testing RFID devices.

The ability to retrieve information regarding an object of interest in an efficient and wireless manner is critical in many types of situations. For example, many current manufacturing and distribution methods require wireless techniques for retrieval of information regarding objects of inventory, which retrieval techniques can be used, for example, to track the location of an object of inventory from the time of its manufacture to the time of its sale to a customer. One well-known wireless technique for retrieving information relating to an object involves coupling to the object a radio frequency identification (RFID) device that stores pertinent information relating to the object and that wirelessly communicates such information to an electronic reader in response to a wireless interrogation. The types of information that may be stored on the RFID device may include, for example, a unique identification number, an expiration date, a "born on" date, manufacturing information, shipment status, pricing information and the like.

One well-known type of RFID device comprises an antenna and an integrated circuit (IC) chip mounted on the antenna, the IC chip being programmed to store the desired information. When subjected to an interrogation signal, the IC chip converts said programmed information into a corresponding electromagnetic signal, which is then propagated as radio frequency waves by the antenna.

Typically, a plurality of RFID devices of the type described above are manufactured on a common carrier web, with the antennae of the RFID devices mounted on the carrier web and the IC chips mounted on their respective antennae. The combination of an individual RFID device and its underlying portion of the carrier web is typically referred to in the art as an RFID inlay. The interconnected web of RFID inlays is typically wound by its manufacturer into roll form for shipping and further processing by a customer (the customer often called a "converter"). The converter may, for example, cut individual RFID inlays out of the web and thereafter attach the individual RFID inlays to corresponding objects of interest using plastic fasteners or other attaching means. Alternatively, the roll manufacturer may further process the web of RFID inlays to yield a web of adhesive RFID labels (see, for example, U.S. Ser. No. 10/961,590, which is incorporated herein by reference), which the converter may then dispense as-is onto objects or which the converter may customize by printing text, designs or other markings onto the labels prior to dispensing the labels onto the objects of interest. Typically, an automated dispenser is used by the converter to dispense the labels from the web onto the objects of interest.

As can be appreciated, if one wishes to be able to retrieve the information associated with a desired object, one should not apply a defective RFID device to the object. Unfortunately, the occurrence of defective RFID devices is not trivial, with current estimates of defective RFID devices being as high as about 1–20% of all RFID devices produced. Consequently, it is common for RFID devices to be tested for performance prior to their application to objects. Such testing may be performed by the roll manufacturer prior to shipping the roll to the converter, with defective inlays or defective labels being marked as such by the manufacturer using appropriate printed markings (such as a black dot). Such testing may also be performed by the converter prior to dispensing since defects may occur during shipping or handling of the roll after testing by the manufacturer. It is generally desirable to identify defective inlays as early as possible in the supply chain for reasons of both cost and throughput at subsequent stages.

Currently, the testing of RFID devices is typically performed using either one of two different testing techniques, namely, short-range testing and long-range testing. These two testing techniques reflect the differences in electromagnetic physics that exist in the areas around an antenna. There are three commonly accepted regions around an antenna, namely, (i) the reactive near-field (where antennae operate from zero distance to approximately $R<=\ddot{e}/2_\delta$(at 915 MHz, ~52 mm)), (ii) the radiating near-field (where $R>\ddot{e}/2_\delta$ and $R<2D^2/\ddot{e}$, where D is the largest dimension of the antenna aperture), and (iii) the radiating far-field (where $R>2D^2/\ddot{e}$). Short-range testing involves testing within the reactive near-field, and long-range testing involves testing within the radiating near-field or the radiating far-field. In general, long-range testing is likely to be truer to a real life application, wherein the RFID device is likely to be applied to an object and then interrogated at a range within the radiating near-field or far-field regions. One problem with long-range testing is that, because of the proximity of RFID devices to one another on a common carrier web, the interrogation signal emitted from the tester typically elicits responses from a plurality of neighboring RFID devices, many of these responses then being simultaneously detected by the tester. Because there is currently no way to correlate the responses from the responding RFID devices to the physical locations of the responding RFID devices (since the unique identifiers of the RFID devices typically do not follow a particular sequence and are effectively randomized), even if the reader notes that a defective device is present, there is no way to know which of the responding devices is the detected defective device.

One approach to the foregoing problem has been to position an apertured metal shield over the web so that all of the devices within range of the interrogation signal, except for the one device that is positioned within the aperture, are shielded from the interrogation signal. An example of this approach is disclosed in U.S. Pat. No. 6,104,291, inventors Beauvillier et al., which issued Aug. 15, 2000, and which is incorporated herein by reference. One shortcoming of this approach is that the shielding, itself, represents a departure from the operating conditions to which a device "in the field" is typically exposed and may affect the performance characteristics of the device being tested.

An example of short-range testing is disclosed in International Publication No. WO 2004/072892 A2, which was published Aug. 24, 2004, and which is incorporated herein by reference. In this type of short-range testing, an interrogator is capacitively coupled to the particular device one wishes to test.

Although short-range testing in general overcomes the problem of multiple devices being simultaneously activated by a single interrogation, the behavior of RFID devices in the near-field reactive region is different from that expected in the near-field and far-field radiating regions, and hence, there is less confidence without additional analysis that the test results will be valid to the real life application.

Other documents that may be of interest include the following, all of which are incorporated herein by reference: U.S. Pat. No. 6,784,789, inventors Eroglu et al., which issued Aug. 31, 2004; U.S. Pat. No. 6,721,912, inventors Burger et al., which issued Apr. 13, 2004; U.S. Pat. No. 6,487,681, inventors Tuttle et al., which issued Nov. 26, 2002; U.S. Pat. No. 6,412,086, inventors Friedman et al., which issued Jun. 25, 2002; U.S. Pat. No. 6,275,043, inventors Mühlberger et al., which issued Aug. 14, 2001; U.S. Pat. No. 6,259,353, inventors Berger et al., which issued Jul. 10, 2001; U.S. Pat. No. 6,236,223, inventors Brady et al., which issued May 22, 2001; U.S. Pat. No. 6,058,497, inventor Tuttle, which issued May 2, 2000; and U.S. Pat. No. 5,983,363, inventors Tuttle, which issued Nov. 9, 1999.

SUMMARY OF THE INVENTION

In accordance with various possible exemplary embodiments thereof the present invention provides a novel method and system for testing RFID devices, particularly a plurality of RFID devices disposed on a web or other common carrier, that overcomes at least some of the shortcomings noted above in connection with existing methods and systems for testing RFID devices.

The present invention is based, at least in part, on the discovery that, in those instances in which RFID devices are positioned sufficiently closely to one another that one or more neighboring RFID devices may simultaneously respond when an RFID device of interest is interrogated by a long-range tester, one may determine the long-range test results for the RFID device of interest by positioning a short-range tester a known interval from the long-range tester, using the short-range tester to read/write a unique identifier for the RFID device of interest and then using the unique identifier for the RFID device of interest to determine the long-range test results for the RFID device of interest.

Therefore, according to one aspect of the invention, there is provided a system for testing at least one of a plurality of RFID devices spaced closely together, said system comprising (a) a short-range tester for reading/writing a unique identifier for an RFID device positioned at a short-range testing position; (b) a long-range tester for testing an RFID device positioned at a long-range testing position, said long-range testing position being spaced apart from said short-range testing position by a predetermined distance; (c) means for moving an RFID device from one to the other of said short-range testing position and said long-range testing position; and (d) means for distinguishing the results of the long-range testing of an RFID device positioned at the long-range testing position from the results of any other simultaneously detected RFID devices.

According to another aspect of the invention, there is provided a system for testing at least one of a plurality of RFID devices spaced closely together, said system comprising (a) a short-range tester for reading/writing a unique identifier for an RFID device positioned at a short-range testing position; (b) a long-range tester for testing an RFID device positioned at a long-range testing position, said long-range testing position being spaced apart from said short-range testing position by a predetermined distance; (c) means for moving an RFID device from said short-range testing position to said long-range testing position; and (d) means for causing the long-range tester to interrogate only the RFID device positioned at the long-range testing position.

According to still yet another aspect of the invention, there is provided a method of testing at least one of a plurality of RFID devices, the RFID devices being spaced along a length of a common carrier, each of the RFID devices having a unique identifier, said method comprising the steps of (a) providing a testing system, the testing system comprising a short-range tester for reading a unique identifier for an RFID device positioned at a short-range testing position, a long-range tester for testing an RFID device positioned at a long-range testing position, the short-range testing position and the long-range testing position being spaced apart by a known distance, and a computer coupled to each of the short-range tester and the long-range tester; (b) positioning the common carrier so that a first RFID device is positioned at the short-range testing position; (c) while the first RFID device is positioned at the short-range testing position, using the short-range tester to read the unique identifier for the first RFID device; (d) transmitting to the computer the identity of the unique identifier for the first RFID device; (e) positioning the common carrier so that the first RFID device is positioned at the long-range testing position; (f) while the first RFID device is positioned at the long-range testing position, using the long-range tester to test the first RFID device for performance; (g) transmitting any results read by the long-range tester to the computer; and (h) using the computer to distinguish the results of the long-range testing of the first RFID device from the results of any other simultaneously detected RFID devices on the basis of the unique identifier for the first RFID device.

According to still yet another aspect of the invention, there is provided a method of testing at least one of a plurality of RFID devices, the RFID devices being spaced along a length of a common carrier, said method comprising the steps of (a) providing a testing system, the testing system comprising a short-range tester for reading a unique identifier for an RFID device positioned at a short-range testing position, a long-range tester for testing an RFID device positioned at a long-range testing position, the short-range testing position and the long-range testing position being spaced apart by a known distance, and a computer coupled to each of the short-range tester and the long-range tester; (b) positioning the common carrier so that a first RFID device is positioned at the short-range testing position; (c) while the first RFID device is positioned at the short-range testing position, using the short-range tester to read/write a unique identifier for the first RFID device; (d) transmitting to the computer the identity of the unique identifier for the first RFID device; (e) positioning the common carrier so that the first RFID device is positioned at the long-range testing position; (f) while the first RFID device is positioned at the long-range testing position, using the long-range tester to test the first RFID device for performance, the long-range tester interrogating only the first RFID device; and (g) transmitting any results read by the long-range tester to the computer.

According to even still another aspect of the invention, there is provided a method of testing at least one of a plurality of RFID devices, the RFID devices being spaced along a length of a common carrier, said method comprising the steps of (a) providing a testing system, the testing system comprising a short-range tester for writing a unique identifier onto an RFID device positioned at a short-range testing position, a long-range tester for testing an RFID device positioned at a long-range testing position and a computer coupled to each of the short-range tester and the long-range tester, the short-range testing position and the long-range testing position being spaced apart by a known distance; (b) positioning the common carrier so that a first RFID device is positioned at the short-range testing position; (c) while the first RFID device is positioned at the short-range testing position, using the short-range tester to write a unique identifier onto the first RFID device, the identity of the unique identifier for the first RFID device being known to the computer; (d) positioning the common carrier so that the first RFID device is positioned at the long-range testing position; (e) while the first RFID device is positioned at the long-range testing position, using the long-range tester to test the first RFID device for performance; (f) transmitting any results read by the long-range tester to the computer; and (g) using the computer to distinguish the results of the long-range testing of the first RFID device from the results of any other simultaneously detected RFID devices on the basis of the unique identifier for the first RFID device.

According to a further aspect of the invention, there is provided a method of testing a plurality of RFID devices, the RFID devices being evenly spaced along a length of a common carrier, each of the RFID devices having a unique identifier, said method comprising the steps of (a) providing a testing system, the testing system comprising a short-range tester for reading the unique identifier for an RFID device positioned at a short-range testing position, a long-range tester for testing an RFID device positioned at a long-range testing position and a computer coupled to each of the short-range tester and the long-range tester, the short-range testing position and the long-range testing position being spaced apart by one or more RFID device positions on the common carrier; (b) positioning the common carrier so that a first RFID device is positioned at the short-range testing position; (c) while the first RFID device is positioned at the short-range testing position, using the short-range tester to read the unique identifier for the first RFID device; (d) transmitting to the computer the identity of the unique identifier for the first RFID device; (e) repositioning the common carrier so that a second RFID device is positioned at the short-range testing position, the second RFID device being positioned consecutively to the first RFID device on the common carrier; (f) while the second RFID device is positioned at the short-range testing position, using the short-range tester to read the unique identifier for the second RFID device; (g) transmitting the unique identifier for the second RFID device to the computer; (h) repeating steps (e) through (g) as needed for one or more RFID devices consecutive to the second RFID device until the first RFID device is positioned at the long-range testing position; (i) while the first RFID device is positioned at the long-range testing position, using the long-range tester to test the first RFID device for performance; (j) transmitting to the computer any results read by the long-range tester with the first RFID device in the long-range testing position; and (k) using the computer to distinguish the long-range testing results of the first RFID device from any other detected RFID devices on the basis of the unique identifier of the first RFID device.

For purposes of the present specification and claims, various relational terms like "top," "bottom," "over," and "under," are used to describe the present invention when said invention is positioned in or viewed from a given orientation. It is to be understood that, by altering the orientation of the invention, certain relational terms may need to be adjusted accordingly.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1A:
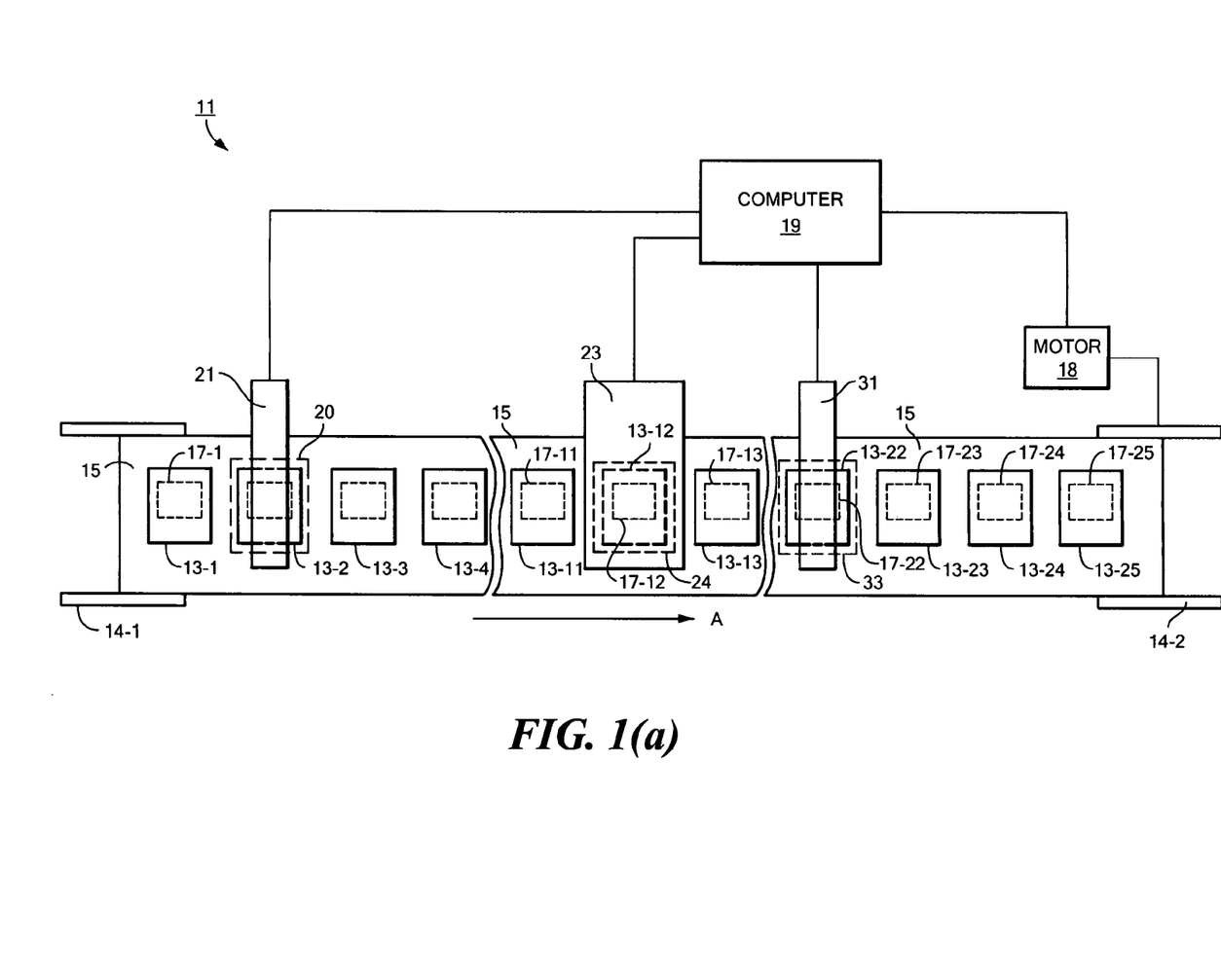
FIGS. 1(a) and 1(b) are fragmentary schematic top and fragmentary schematic side views, respectively, of a first embodiment of a system constructed according to the teachings of the present invention for testing a plurality of RFID devices disposed on a common carrier (with certain obscured elements in FIG. 1(a) being shown using dotted lines)
Figure 1B:
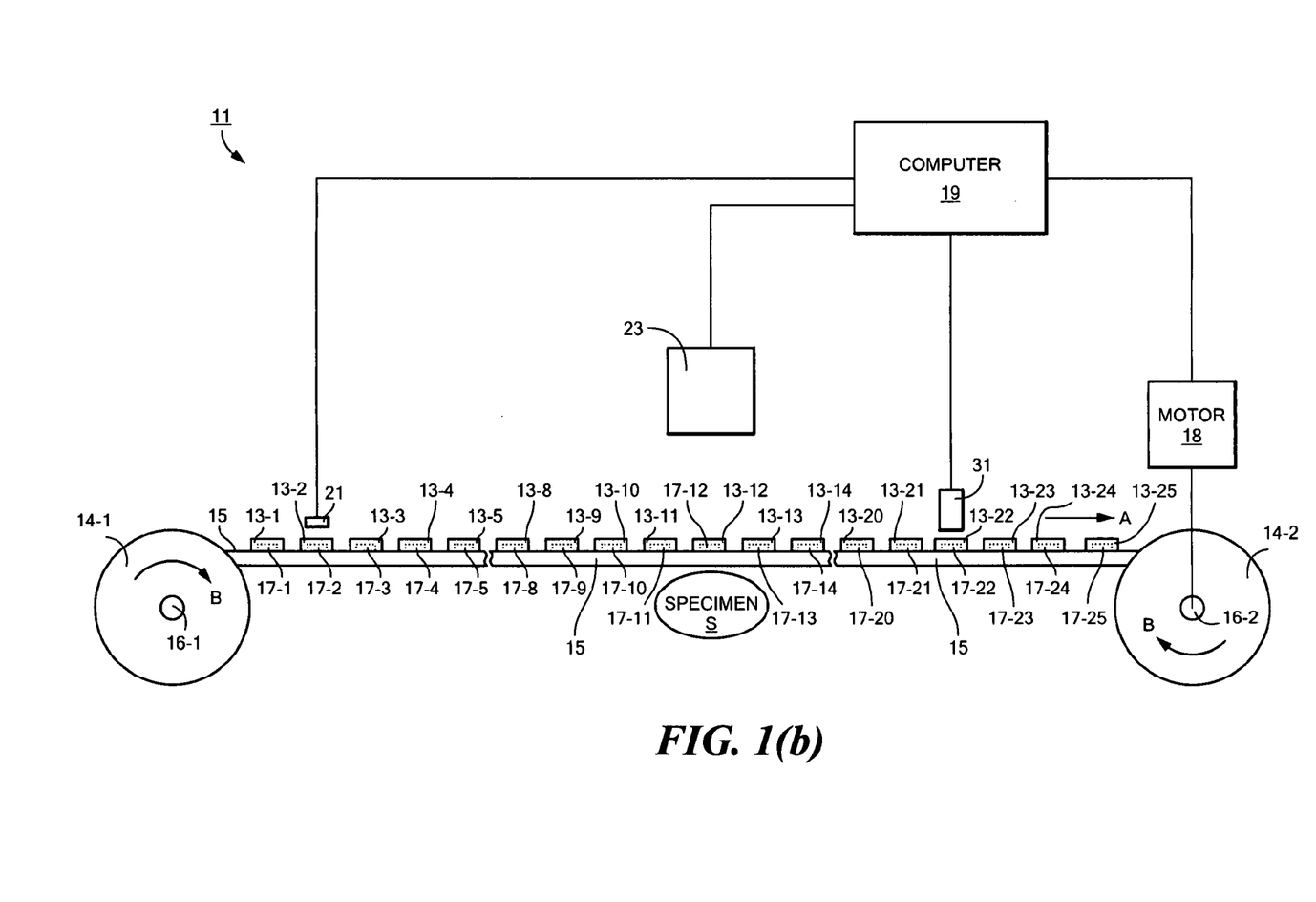

Referring now to FIGS. 1(a) and 1(b), there are shown fragmentary schematic top and fragmentary schematic side views, respectively, of a first embodiment of a system for testing a plurality of RFID devices disposed on a common carrier, the system being constructed according to the teachings of the present invention and represented generally by reference numeral 11. To facilitate an understanding of the construction and operation of system 11, system 11 is shown being used to test a plurality of RFID labels 13-1 through 13-25, RFID labels 13-1 through 13-25 being spaced apart and releasably mounted on a common carrier 15. In the embodiment shown, labels 13 and carrier 15 are presented in roll form and are shown being conducted from an unwind reel 14-1 to a take-up reel 14-2, but it can be appreciated that labels 13 and carrier 15 may alternatively be presented in sheet form. RFID labels 13-1 through 13-25 include IC chips 17-1 through 17-25, respectively (IC chips 17-1 through 17-25 being shown in phantom in FIG. 1(a)), each IC chip 17 being programmed, typically by the chip manufacturer, with a unique identifier, which is typically in the form of 64 or 96 bit data. For purposes of the present invention, one may assume that the pre-programmed identifiers do not follow any particular sequence in chips 17-1 through 17-25, i.e., chips 17-1 through 17-25 are effectively randomized positionally with respect to their identifiers.

System 11 includes means for conducting the roll of labels 13 from unwind reel 14-1 to take-up reel 14-2, i.e., in the direction of arrow A. In the present embodiment, said conducting means comprises a pair of spindles 16-1 and 16-2. Unwind reel 14-1 is mounted on and coupled to spindle 16-1, and take-up reel 14-2 is mounted on and coupled to spindle 16-2, spindles 16-1 and 16-2 being rotatable in the direction of arrows B. Spindle 16-2 is coupled to a motor 18 which drives the rotation of spindle 16-2. Motor 18, in turn, is coupled to a computer 19, computer 19 controlling the operation of motor 18. In the present embodiment, computer 19 causes motor 18 to advance the roll of labels 13 in an indexing fashion, one label position at a time, so that each label 13 may be tested at each of the testing locations specified below. However, it should be appreciated that the labels need not be stationary when tested and that the roll of labels 13 may be advanced in a continuous manner, i.e., without indexing. It should also be understood that system 11 may include optical or other registration sensors (not shown) coupled to computer 19 for use in synchronizing the operation of motor 18 and/or other components of system 11 to be discussed below.

System 11 also includes a short-range tester 21. Short-range tester 21, which may be conventional in nature, is appropriately positioned relative to carrier 15 to read one RFID label 13 at a time, the particular RFID label 13 that is being read by short-range tester 21 (in the present case, label 13-2) being positioned at a short-range testing position 20 (shown in phantom in FIG. 1(*a*)) within the reactive near-field. Short-range tester 21 is not used to conduct a performance test of an interrogated RFID label 13, but rather, is used merely to read the unique identifier of its chip 17. As the identifier of each chip 17 is read by short-range tester 21, this information is transmitted to a computer 19, which stores the identifier information and keeps track of the order in which the various identifiers are read. (In the event that a label 13 is so defective that its identifier cannot be read by short-range tester 21, the defective condition of the label 13 is noted by computer 19.) In the above manner, the relative positions of labels 13-1 through 13-25 on carrier 15 are determined by system 11.

In the event that the chips 17 are not of the type that are pre-programmed with an identifier, short-range tester 21 is preferably used to write a unique identifier onto each of chips 17. Preferably, the unique identifiers are sequenced to provide positional information about the respective chips, but they need not be.

System 11 additionally includes a long-range tester 23. Long-range tester 23, which may be conventional in nature, is positioned downstream of short-range tester 21 to test a label 13 (in the present case, label 13-12) positioned at a long-range testing position 24 (shown in phantom in FIG. 1(*a*)) within the radiating near-field or far-field, long-range testing position 24 being a predetermined distance away from short-range testing position 20. (For example, long-range testing position 24 may be located ten label positions downstream of short-range testing position 20.) The type of test conducted by long-range tester 23 may be a simple read/no-read type of test or may involve varying the power and/or frequency of the interrogator signal to ensure that a desired level of performance is achieved or maintained. In the event that a label 13 is identified at short-range testing position 20 as being unreadable, the performance testing of said label by long-range tester 23 at long-range testing position 24 may be, and is preferably, skipped. If desired, a specimen S, such as a pharmaceutical bottle, a corrugated container or other object of the type to which label 13 is intended to be applied, may be positioned just below carrier 15 at long-range testing position 24 to more closely simulate the conditions that will be experienced by the label once applied to an object and in actual use. The responses detected by long-range tester 23 are transmitted to computer 19 for analysis in the manner discussed below.

It should be noted that, because system 11 does not employ means for shielding the interrogation signal to elicit a response from only the label 13 positioned at the long-range testing position 24 (in this case, label 13-12), one or more neighboring labels 13 may respond to the interrogation, each of these responses including the identifier for the responding label 13. However, even if long-range tester 23 detects signals from one or more labels 13 in addition to the label 13 positioned at long-range testing position 24, the response for the label 13 at long-range testing position 24 can still be identified by computer 19. This is because the spacing between short-range testing position 20 and long-range testing position 24 is known and because the relative order of identifiers for the various labels 13 is known. Consequently, to identify the response for the label 13 positioned at long-range testing position 24, computer 19 need only recognize the response whose identifier was read by short-range tester 21 n label positions ago, where long-range testing position 24 and short-range testing position 20 are separated by n label positions. In other words, if the spacing between short-range testing position 20 and long-range testing position 24 is ten label positions, then the response for the label 13 at long-range testing position 24 is the response whose identifier was read by short-range tester 21 ten label positions earlier. Such determinations can readily be performed by computer 19.

It should be understood that, instead of having long-range tester 23 read all of the responses from the responding labels 13 and then having computer 19 identify the response of interest based on its identifier, computer 19 may simply instruct long-range tester 23 to interrogate only the label 13 having the identifier of interest.

It should also be understood that the functions performed by computer 19 could alternatively be implemented as a logic function within one or both of short-range tester 21 and long-range tester 23.

System 11 further comprises a printer or marker 31. Printer 31, which may be a conventional printer of the type used to print markings on RFID labels, is positioned downstream of long-range tester 23 and is adapted to print a marking on a label 13 (in this case, label 13-22) positioned at a printing position 33 (shown in phantom in FIG. 1(*a*)), printing position 33 being a predetermined distance away from long-range testing position 24. (For example, printing position 33 may be located ten label positions downstream of long-range testing position 24.) Printer 31 is coupled to computer 19 and its operation is controlled by computer 19. In the present embodiment, when computer 19 identifies a defective label 13, printer 31 is instructed by computer 19 to mark the label 13 as defective when the label 13 is positioned at printing position 33.

It should be appreciated that system 11 could be modified to include one or more additional long-range testers spaced downstream from long-range tester 23 at predetermined label position intervals. Such additional long-range testers may be used to test labels 13 while they are positioned over one or more types of specimens that are different than that positioned under the labels at long-range testing position 24. (For example, a first specimen may be a plastic object, such as a pharmaceutical bottle, a second specimen may be a corrugated container, a third specimen may be a metal object, etc. Alternatively, the various specimens may be identical items containing different types of materials.) In this manner, the performance characteristics of the labels may tested under various conditions.

It should also be appreciated that, although labels 13-1 through 13-25 are shown in the present embodiment arranged in a single column along carrier 15, labels 13 could be arranged in two or more columns on carrier 15, and system 11 could be correspondingly modified to include as many additional short-range testers 21, long-range testers 23 and/or printers 31 as necessary.

Figure 2A:
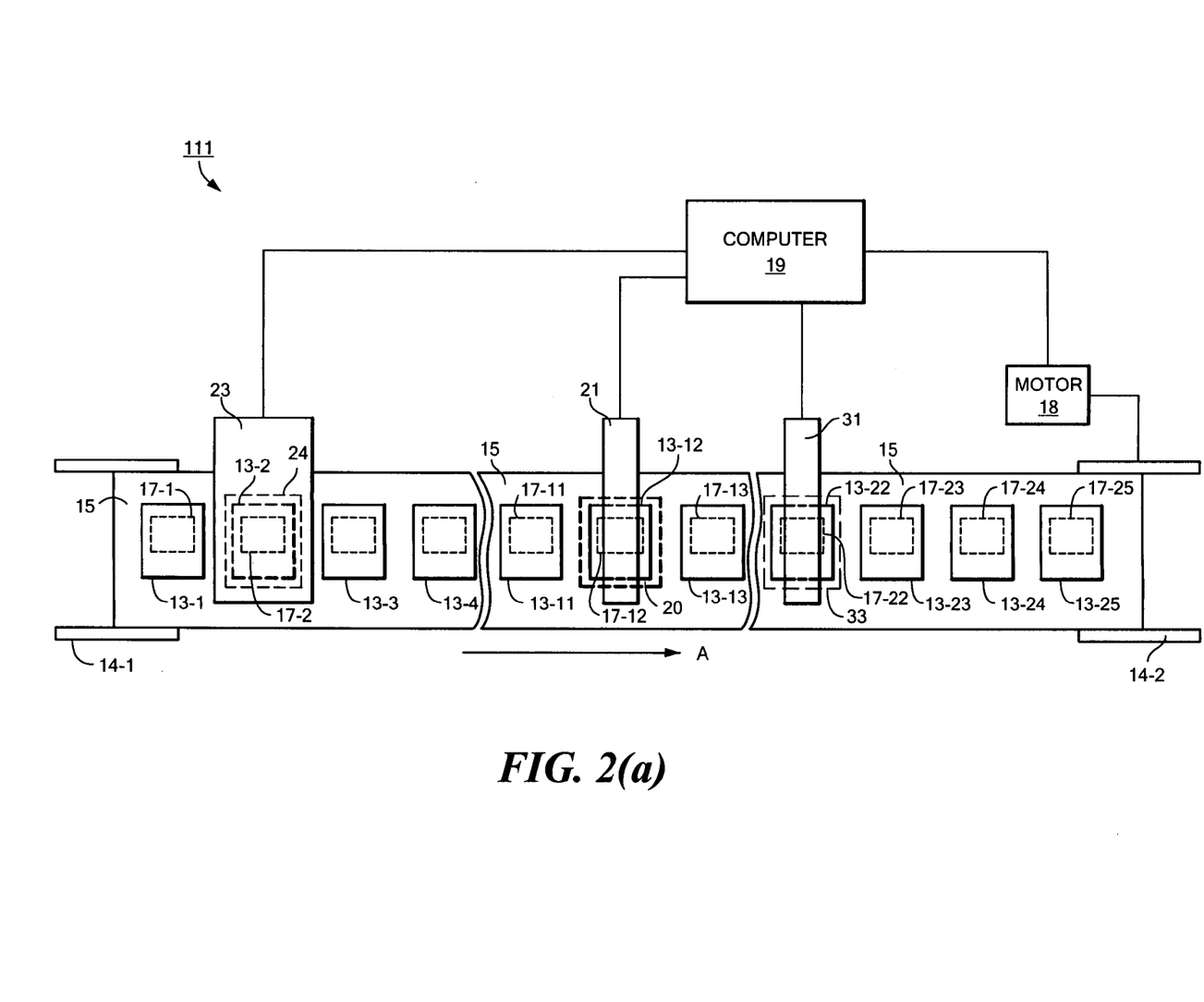
FIGS. 2(a) and 2(b) are fragmentary schematic top and fragmentary schematic side views, respectively, of a second embodiment of a system constructed according to the teachings of the present invention for testing a plurality of RFID devices disposed on a common carrier (with certain obscured elements in FIG. 2(a) being shown using dotted lines)
Figure 2B:
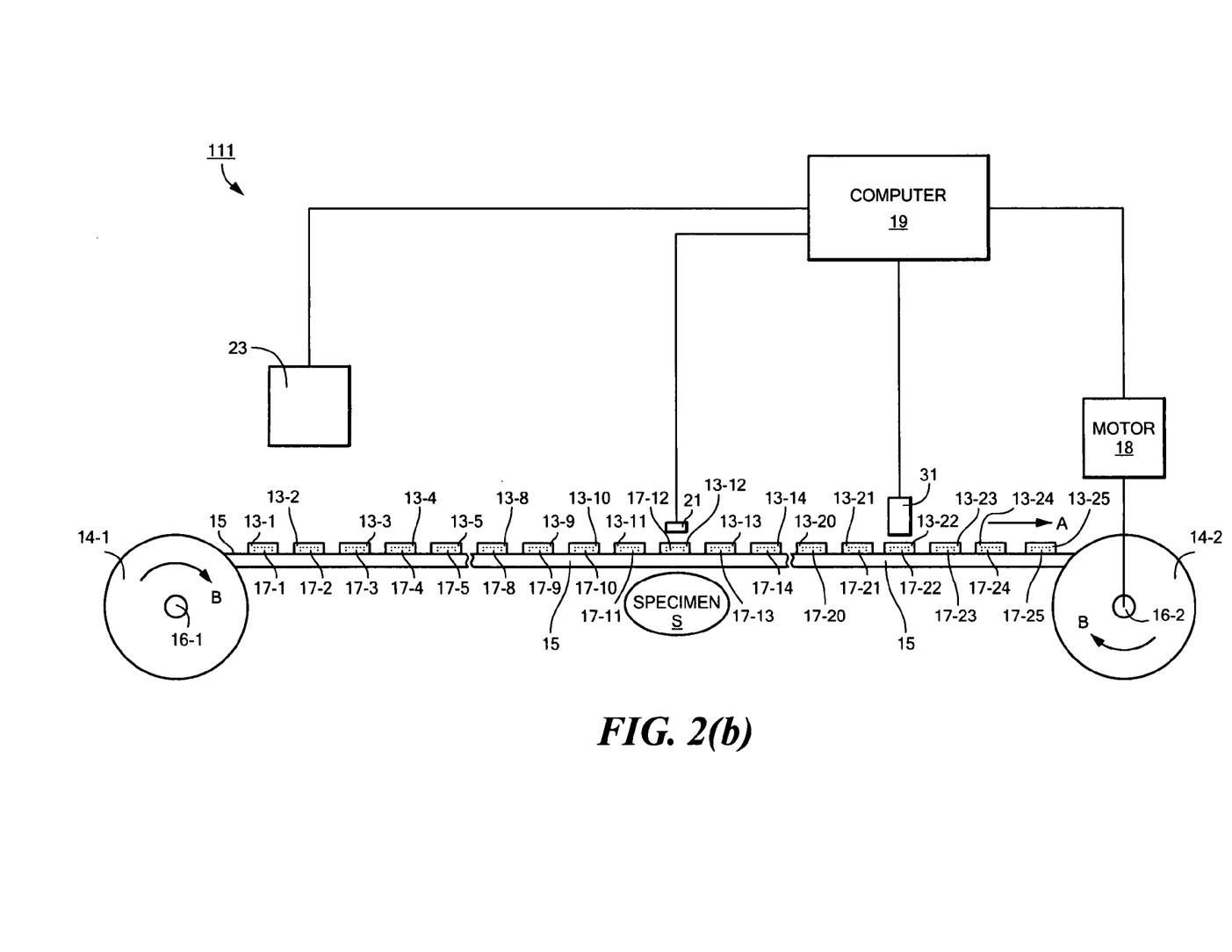

Referring now to FIGS. 2(a) and 2(b), there are shown fragmentary schematic top and fragmentary schematic side views, respectively, of a second embodiment of a system for testing a plurality of RFID devices disposed on a common carrier, the system being constructed according to the teachings of the present invention and represented generally by reference numeral 111.

System 111 is similar in many respects to system 11, the principal difference between the two systems being that, in system 111, the respective positions of short-range tester 21 and long-range tester 23 are reversed, as compared to system 11. Consequently, in system 111, short-range tester 21 is positioned in such a way as to test labels located at what is the long-range testing position 24 in system 11, and long-range tester 23 is positioned in such a way as to test labels located at what is the short-range testing position 20 in system 11. As can be appreciated, because of the reversal of positions of short-range tester 21 and long-range tester 23 in system 111, all of the results read by long-range tester 23 are recorded in computer 19 and are, thereafter, resolved only following the readings taken by short-range tester 21.

If desired, after computer 19 has matched the identity of the label probed by short-range tester 21 with the test results previously obtained for that label by long-range tester 23, short-range tester 21 may then be used to program into the chip of the label (i) positional information about the relative location of that label within the sequence of labels and/or an indication as to whether the label passed the performance test(s) conducted by long-range tester 23. (It should be understood that it will not be possible to write information onto wholly inoperative labels.) Where both positional information and performance information are programmed into the labels, a downstream user of the labels may then read this programmed information, using an electronic reader (e.g., a short-range tester, a long-range tester, etc.), and skip over the labels identified therein as being defective. (Alternatively, a downstream converter or dispenser may identify good labels using a conventional antenna and reader.) As can be appreciated, considerable time may be saved by skipping over defective labels, particularly consecutive defective labels. The positional and performance information for each label may be written into that label alone, or the positional and performance information for two or more of the labels may be written into some or all of the labels. For example, a good label may include information that the next x labels are defective.

If desired, the positional information and the performance indication may be cryptographically written onto the respective label chips by the roll (or sheet) manufacturer using public key infrastructure, one-way hashing or another suitable algorithm, the converter being provided separately with code for decrypting the encrypted information. In this manner, counterfeiting may be deterred and the integrity of the label supply may be ensured. The software used to perform the cryptographic validation may need to incorporate features to prevent the cloning of rolls as pre-used codes may still be valid.

As can be appreciated, the writing of positional and performance information onto the chips 17 of labels 13 can likewise be effected in system 11 using long-range tester 23. Such writing may or may not be encrypted, as desired.

In a further embodiment, instead of writing the test results and the positional information onto the labels, themselves, such information may be stored in a file that is physically separate from the roll (or sheet) of labels. Such a file may then be separately transmitted to a downstream user of the roll (or sheet) of labels. Using such a file, the downstream user of the roll (or sheet) of labels may simply skip bad label positions without testing each label.

Figure 3:
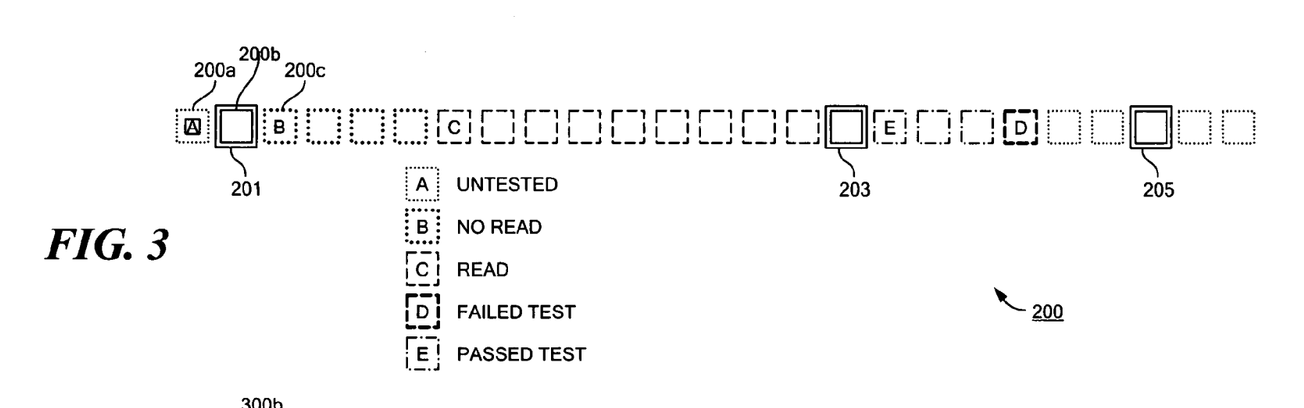
FIG. 3 is a schematic diagram of control software for a third embodiment of a system constructed according to the teachings of the present invention for testing a plurality of RFID devices disposed on a common carrier.
Figure 4:
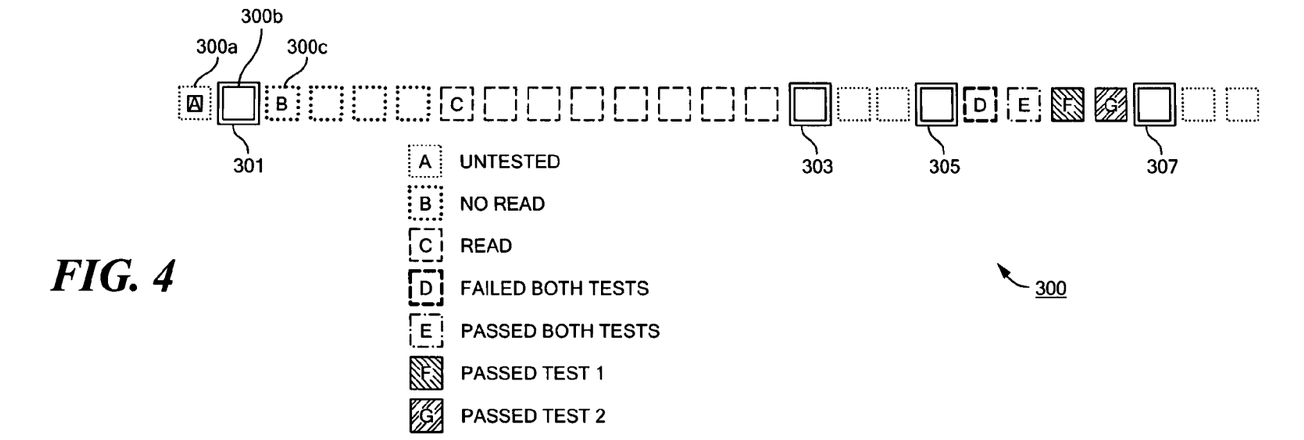
FIG. 4 is a schematic diagram of control software for a fourth embodiment of a system constructed according to the teachings of the present invention for testing a plurality of RFID devices disposed on a common carrier.

As shown in the schematic diagrams of FIGS. 3 and 4, the testing system of the present invention can include control software to provide straightforward reliable testing procedures, as well as more advanced procedures that can achieve enhanced accuracy and versatility in performance testing of RFID inlays. The schematic diagram 200 of FIG. 3 illustrates a simple testing control system in which successive inlay positions are shown by the sequence of smaller sized squares 200a, 200b, 200c, etc. Inlays move one step to the right after each complete ID capture, test, and mark cycle. The larger squares include 201, the position of the short-range tester, 203, the position of the long-range tester, and 205, the position of the printer. As indicated in the legend at A, inlays enter the system at the left with unknown IDs. The short-range tester attempts to capture the inlays' IDs at position 201; inlays that cannot be read by the short-range tester are shown as unreadable at B. The system does not thereafter attempt to read the unreadable inlays at the long-range testing position 203. Inlays that are successfully identified by the short-range tester are shown at C until they reach the long-range testing position 203. Inlays successfully identified at position 201 that fail the long-range test at position 203 are shown at D, while identified inlays that pass the long-range test at position 203 are shown at E. The failed inlays D are marked as such by the printer at position 205.

The ability to correlate inlay IDs and corresponding inlay positions with long-range test results not only allows the system to distinguish the results of individual long-range tests of RFID devices and associate these tests with given (identified) devices, but also allows more advanced testing techniques. For example, the system can implement testing procedures relating to a series of inlays (including, for example, the inlays within a roll of inlays, as well as a series of a few adjacent inlays). For example, the system may "fail" a roll of inlays (or require the editing or removal of a portion of that roll) if too many inlays in sequence are failed, a condition which may interfere with printing or application of tags or labels.

FIG. 4 is a schematic diagram 300 of control software for a testing system incorporating two long-range testers, as described above. Successive inlay positions are shown by the sequence of smaller sized squares 300a, 300b, 300c, etc. Inlays move one step to the right after each complete ID capture, test, and mark cycle. As indicated in the legend at A, inlays enter the system at the left with unknown IDs. The short-range tester attempts to capture the inlays' IDs at position 301; inlays that cannot be read by the short-range tester are shown as unreadable at B. The system does not thereafter attempt to read the unreadable inlays. Inlays that are successfully identified by the short-range tester are shown at C until they reach the long-range testing position 303. The first long-range tester carries out test number 1 at position 303 while the second long-range tester carries out test number 2, e.g., using a different testing specimen or material, at position 305. The test outcomes following the two long-range tests are not limited to "pass" (in this case, an inlay passes both tests E) and "fail" (i.e., an inlay fails both tests D), but also include the possibility that an inlay passes only test number 1 (shown at F) or passes only test number 2 (shown at G). (In addition, for inlays that have passed test number 1 but have not yet been subjected to test number 2, one could also provide an appropriate indication.) Thus, tests 1 and 2 may be designed to identify inlays that are acceptable for respective ranges of applications or use environments, and each of the test outcomes F and G may be used to identify inlays that are acceptable for the respective range of applications. An appropriate inlay marking scheme is used by a printer at printing position 307 to identify these various test results. Variations of this multiple long-range test scheme may include, for example, one or more mandatory tests, e.g., to evaluate basic performance requirements, and one or more optional tests, e.g., to evaluate specialized performance characteristics.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A system for testing at least one of a plurality of RFID devices spaced closely together, said system comprising:
    (a) a short-range tester for reading/writing a unique identifier for an RFID device positioned at a short-range testing position;
    (b) a first long-range tester for testing an RFID device positioned at a first long-range testing position, said first long-range testing position being spaced apart from said short-range testing position by a predetermined distance;
    (c) means for moving an RFID device from one to the other of said short-range testing position and said first long-range testing position; and
    (d) means for distinguishing the results of the long-range testing of an RFID device positioned at the first long-range testing position from the results of any other simultaneously detected RFID devices.

2. The system as claimed in claim 1 wherein said moving means positions an RFID device first at the short-range testing position and then at the first long-range testing position.

3. The system as claimed in claim 1 wherein said moving means positions an RFID device first at the first long-range testing position and then at the short-range testing position.

4. The system as claimed in claim 1 wherein the plurality of RFID devices are evenly spaced along a length of a common carrier and wherein the short-range testing position and the first long-range testing position are spaced apart by a distance corresponding to one or more RFID device positions on the common carrier.

5. The system as claimed in claim 1 further comprising means, coupled to said distinguishing means, for printing a marking on an RFID device found to be defective.

6. The system as claimed in claim 1 further comprising a first specimen positioned proximate to said first long-range testing position to simulate an object with which the RFID device may be associated when in use.

7. The system as claimed in claim 1 further comprising a second long-range tester for testing an RFID device positioned at a second long-range testing position, said second long-range testing position being spaced apart from and positioned between said short-range testing position and said first long-range testing position, and wherein said distinguishing means further distinguishes the results of the long-range testing of an RFID device positioned at the second long-range testing position from the results of any other simultaneously detected RFID devices.

8. The system as claimed in claim 7 further comprising a second specimen positioned proximate to said second long-range testing position to simulate an object with which the RFID device may be associated when in use, said second specimen differing from said first specimen.

9. A system for testing at least one of a plurality of RFID devices spaced closely together, said system comprising:
    (a) a short-range tester for reading/writing a unique identifier for an RFID device positioned at a short-range testing position;
    (b) a first long-range tester for testing an RFID device positioned at a first long-range testing position, said first long-range testing position being spaced apart from said short-range testing position by a predetermined distance;
    (c) means for moving an RFID device from said short-range testing position to said first long-range testing position; and
    (d) means for causing the first long-range tester to interrogate only the RFID device positioned at the first long-range testing position.

10. The system as claimed in claim 9 further comprising means for printing a marking on an RFID device found to be defective.

11. The system as claimed in claim 9 wherein the plurality of RFID devices are evenly spaced along a length of a common carrier and wherein the short-range testing position and the first long-range testing position are spaced apart by a distance corresponding to one or more RFID device positions on the common carrier.

12. The system as claimed in claim 11 wherein said moving means moves the common carrier in an indexing fashion, one RFID device position at a time.

13. The system as claimed in claim 11 wherein said moving means moves the common carrier in a continuous fashion.

14. The system as claimed in claim 9 further comprising a specimen positioned proximate to said first long-range testing position to simulate an object with which the RFID device may be associated when in use.

15. The system as claimed in claim 9 further comprising a second long-range tester for testing an RFID device positioned at a second long-range testing position, said second long-range testing position being spaced apart from and positioned between said short-range testing position and said first long-range testing position, and wherein said causing means further causes the second long-range tester to interrogate only the RFID device positioned at the second long-range testing position.

16. The system as claimed in claim 15 further comprising a second specimen positioned proximate to said second long-range testing position to simulate an object with which the RFID device may be associated when in use, said second specimen differing from said first specimen.

17. A method of testing at least one of a plurality of RFID devices, the RFID devices being spaced along a length of a common carrier, each of the RFID devices having a unique identifier, said method comprising the steps of:
    (a) providing a testing system, the testing system comprising a short-range tester for reading a unique identifier for an RFID device positioned at a short-range testing position, a long-range tester for testing an RFID device positioned at a long-range testing position, the short-range testing position and the long-range testing position being spaced apart by a known distance, and a computer coupled to each of the short-range tester and the long-range tester;

(b) positioning the common carrier so that a first RFID device is positioned at the short-range testing position;

(c) while the first RFID device is positioned at the short-range testing position, using the short-range tester to read the unique identifier for the first RFID device;

(d) transmitting to the computer the identity of the unique identifier for the first RFID device;

(e) positioning the common carrier so that the first RFID device is positioned at the long-range testing position;

(f) while the first RFID device is positioned at the long-range testing position, using the long-range tester to test the first RFID device for performance;

(g) transmitting any results read by the long-range tester to the computer; and (h) using the computer to distinguish the results of the long-range testing of the first RFID device from the results of any other simultaneously detected RFID devices on the basis of the unique identifier for the first RFID device.

18. The method as claimed in claim 17 wherein steps (b) through (d) are performed prior to steps (e) through (g).

19. The method as claimed in claim 17 wherein steps (e) through (g) are performed prior to steps (b) through (d).

20. The method as claimed in claim 17 further comprising, after said distinguishing step, the step of writing onto the first RFID device the results of the long-range testing of the first RFID device.

21. The method as claimed in claim 20 wherein the written results of the long-range testing of the first RFID device are encrypted.

22. The method as claimed in claim 17 further comprising, after said distinguishing step, the step of writing onto the first RFID device the results of the long-range testing of the first RFID device and positional information regarding the first RFID device.

23. The method as claimed in claim 22 wherein the written results of the long-range testing of the first RFID device are encrypted.

24. A method of testing at least one of a plurality of RFID devices, the RFID devices being spaced along a length of a common carrier, said method comprising the steps of:

(a) providing a testing system, the testing system comprising a short-range tester for writing a unique identifier onto an RFID device positioned at a short-range testing position, a long-range tester for testing an RFID device positioned at a long-range testing position and a computer coupled to each of the short-range tester and the long-range tester, the short-range testing position and the long-range testing position being spaced apart by a known distance;

(b) positioning the common carrier so that a first RFID device is positioned at the short-range testing position;

(c) while the first RFID device is positioned at the short-range testing position, using the short-range tester to write a unique identifier onto the first RFID device, the identity of the unique identifier for the first RFID device being known to the computer;

(d) positioning the common carrier so that the first RFID device is positioned at the long-range testing position;

(e) while the first RFID device is positioned at the long-range testing position, using the long-range tester to test the first RFID device for performance;

(f) transmitting any results read by the long-range tester to the computer; and (g) using the computer to distinguish the results of the long-range testing of the first RFID device from the results of any other simultaneously detected RFID devices on the basis of the unique identifier for the first RFID device.

25. The method as claimed in claim 24 wherein steps (b) through (c) are performed prior to steps (d) through (f).

26. The method as claimed in claim 24 wherein steps (d) through (f) are performed prior to steps (b) through (c).

27. The method as claimed in claim 24 further comprising, after said distinguishing step, the step of writing onto the first RFID device the results of the long-range testing of the first RFID device.

28. The method as claimed in claim 27 wherein the written results of the long-range testing of the first RFID device are encrypted.

29. The method as claimed in claim 24 further comprising, after said distinguishing step, the step of writing onto the first RFID device the results of the long-range testing of the first RFID device and positional information regarding the first RFID device.

30. The method as claimed in claim 29 wherein the written results of the long-range testing of the first RFID device are encrypted.

31. A method of testing a plurality of RFID devices, the RFID devices being evenly spaced along a length of a common carrier, each of the RFID devices having a unique identifier, said method comprising the steps of:

(a) providing a testing system, the testing system comprising a short-range tester for reading the unique identifier for an RFID device positioned at a short-range testing position, a long-range tester for testing an RFID device positioned at a long-range testing position and a computer coupled to each of the short-range tester and the long-range tester, the short-range testing position and the long-range testing position being spaced apart by one or more RFID device positions on the common carrier;

(b) positioning the common carrier so that a first RFID device is positioned at the short-range testing position;

(c) while the first RFID device is positioned at the short-range testing position, using the short-range tester to read the unique identifier for the first RFID device;

(d) transmitting to the computer the identity of the unique identifier for the first RFID device;

(e) repositioning the common carrier so that a second RFID device is positioned at the short-range testing position, the second RFID device being positioned consecutively to the first RFID device on the common carrier;

(f) while the second RFID device is positioned at the short-range testing position, using the short-range tester to read the unique identifier for the second RFID device;

(g) transmitting the unique identifier for the second RFID device to the computer;

(h) repeating steps (e) through (g) as needed for one or more RFID devices consecutive to the second RFID device until the first RFID device is positioned at the long-range testing position;

(i) while the first RFID device is positioned at the long-range testing position, using the long-range tester to test the first RFID device for performance;
(j) transmitting to the computer any results read by the long-range tester with the first RFID device in the long-range testing position; and
(k) using the computer to distinguish the long-range testing results of the first RFID device from any other detected RFID devices on the basis of the unique identifier of the first RFID device.

32. The method as claimed in claim 31 further comprising, after said distinguishing step, the step of writing onto the first RFID device the results of the long-range testing of the first RFID device.

33. The method as claimed in claim 32 wherein the written results of the long-range testing of the first RFID device are encrypted.

34. The method as claimed in claim 31 further comprising, after said distinguishing step, the step of writing onto the first RFID device the results of the long-range testing of the first RFID device and positional information regarding the first RFID device.

35. The method as claimed in claim 34 wherein the written results of the long-range testing of the first RFID device are encrypted.

36. The method as claimed in claim 31 further comprising the steps of positioning the second RFID device at the long-range testing position, using the long-range tester to test the second RFID device for performance while the second RFID device is at the long-range testing position, transmitting to the computer any results read by the long-range tester with the second RFID device at the long-range testing position and using the computer to distinguish the long-range testing results of the second RFID device from any other detected RFID devices on the basis of the unique identifier of the second RFID device.

37. The method as claimed in claim 36 further comprising storing in a file the results of the long-range testing for the first and second RFID devices, as well as positional information for the first and second RFID devices.

38. The method as claimed in claim 37 wherein said file is encrypted.

39. The method as claimed in claim 36 further comprising the step of writing the results of the long-range testing of the first and second RFID devices, as well as positional information regarding the first and second RFID devices, onto at least one of the first and second RFID devices.

40. The method as claimed in claim 39 wherein said writing is encrypted.

41. The method as claimed in claim 31 further comprising the step of positioning a specimen proximate to said long-range testing positioning while said long-range test is conducted.

42. A method of testing at least one of a plurality of RFID devices, the RFID devices being spaced along a length of a common carrier, said method comprising the steps of:
(a) providing a testing system, the testing system comprising a short-range tester for reading a unique identifier for an RFID device positioned at a short-range testing position, a long-range tester for testing an RFID device positioned at a long-range testing position, the short-range testing position and the long-range testing position being spaced apart by a known distance, and a computer coupled to each of the short-range tester and the long-range tester;
(b) positioning the common carrier so that a first RFID device is positioned at the short-range testing position;
(c) while the first RFID device is positioned at the short-range testing position, using the short-range tester to read/write a unique identifier for the first RFID device;
(d) transmitting to the computer the identity of the unique identifier for the first RFID device;
(e) positioning the common carrier so that the first RFID device is positioned at the long-range testing position;
(f) while the first RFID device is positioned at the long-range testing position, using the long-range tester to test the first RFID device for performance, the long-range tester interrogating only the first RFID device; and
(g) transmitting any results read by the long-range tester to the computer.

* * * * *